United States Patent Office 3,138,837
Patented June 30, 1964

3,138,837
METHOD OF MAKING FIBER REINFORCED METALLIC COMPOSITES
John W. Weeton, Rocky River, David L. McDanels and Robert W. Jech, Cleveland, Robert E. Oldrieve, Sandusky, Donald W. Petrasek, Cleveland, and Robert A. Signorelli, Strongsville, Ohio, assignors to the United States of America as represented by the Administrator of the National Aeronautics and Space Administration
No Drawing. Filed Oct. 21, 1960, Ser. No. 64,226
6 Claims. (Cl. 22—203)
(Granted under Title 35, U.S. Code (1952), sec. 266)

The invention described herein may be manufactured and used by or for the Government of the United States of America for governmental purposes without the payment of any royalties thereon or therefor.

This invention concerns fiber reinforced metal composites and the method of manufacture thereof.

Prior art in the field of metal reinforced metallic composites has been work in which titanium and its alloys are reinforced with molybdenum wire and a composite made using powder metallurgy technique and severe mechanical working. The major disadvantage of this is the necessity of mechanically working the composite in order to achieve the desired tensile strength, low degree of porosity, and fiber orientation. An additional disadvantage is the necessity for extensive machining in order to produce a finished shape.

A further disadvantage of this prior art is the necessity for using unusually large powder presses or rolls when large pieces of material are required.

Still another disadvantage of the prior art is that the final properties of the composite are determined by the amount of working given the composite and the temperature at which this is done. Thus, it is almost impossible to predict what the properties of the material will be until it has been tested.

A still further disadvantage of this prior art is that because of the mechanical working, the product is restricted to one which has fibers with a high degree of preferred orientation. Furthermore, the working processes tend to orient the fibers in one principal direction and as such the composite must be highly anisotropic.

An object of this invention is to provide a high strength and high strength-density ratio material for application at both normal room temperatures and at elevated temperatures.

Another object of this invention is to provide high strength and high strength-density ratio, high ductility, and low notch sensitivity materials for application at cryogenic temperatures.

A further object of the invention is to provide a material having a high modulus of elasticity and modulus-to-density ratio over a wide range of temperatures.

Still further object of the invention is to provide a fiber reinforced metallic composite wherein no working of the composite is necessary to utilize the strength or properties desired in the fiber.

Still another object of the invention is to provide a fiber reinforced metallic composite which maintains the original shape, size, and orientation of the fibers.

Still another object of the invention is to provide fiber reinforced metallic composites which may utilize brittle fibers since no working of the fiber is involved in the fabrication of the composite.

The present invention consists of a composite material composed of many high strength fibers such as tungsten fibers at 11 to 87 percent by volume surrounded by and dispersed in a lower strength but more ductile matrix or binder such as copper. The fibers have a diameter of less than 0.010 inch and a length equal to the full length of the specimen. Within the composite, fibers are oriented parallel to each other and parallel to the long dimension of the specimen and extend the full length of the specimen or the length of the stressed portion of the product.

The present method of preparing the composite material consists of packing the fibers in close proximity to each other so that their longitudinal axes are parallel to each other. The fibers are held in this position either by wrapping a helix of wire around the bundle or by forcing the bundle into a ceramic tube which holds them in position during subsequent operations. The specimens are then heated under a protective atmosphere. In the case of the specimens containing large volume percents of fiber, the end of the bundle is immersed in a molten pool of the material to be used as matrix. The fine spaces between the wires serve as capillary tubes through which the molten matrix material flows. The composites are then cooled and the helix unwrapped or the constraining tube removed. The important feature involved in this operation is that the composites are not produced, using conventional casting techniques, but rather by using infiltration. In cases where specimens contain low fiber content or in cases where one arbitrarily chooses to do so, infiltration between fibers may be accomplished by using top-feed infiltration techniques.

The invention will be better understood from the following detailed example:

Cut lengths of tungsten wire were cleaned with sodium peroxide and ammonium hydroxide and loaded into an Alundum tube. This tube was then placed in a closed end quartz tube having a slug of copper infiltrant in the bottom. The entire assembly was heated to 2200° F. and held for one hour at this temperature. During infiltration the spaces between the wires of the tightly-packed bundles serve as capillary tubes through which the molten copper could flow. The specimens were kept under a vacuum during infiltration to prevent oxidation of the tungsten and thereby provide a clean wire surface. This was essential since it is found that any surface film on the wire greatly reduces the chances of producing a successful infiltration. However, hydrogen or inert atmospheres could be used rather than a vacuum.

Some variation in the above procedure is found to be necessary when specimens of low fiber content are made. Because of the larger openings between wires, capillary rise cannot take place and it becomes necessary to top feed the specimens by placing the infiltrating material in the tube above the wires and allowing gravity flow to take place. The specimens so produced range from 40 mils to 1/8 inch in diameter and from 3 to 6 inches in length. The fibers used in the examples were of 3 mil, 5 mil, and 7 mil diameters. It is found that the strength of the composites increase with decreasing wire diameters. This is expected because the finer wires had a higher initial tensile strength. Within the range of the compositions tested it is determined that the strength of the composite is directly proportional to the amount of reinforcements present.

It is to be understood that tungsten fibers in a copper matrix have been shown only by way of specific example. This invention embraces the combination of any high strength fiber in a more ductile matrix to produce a composite having the desirable properties of each. Additionally, it is to be understood that the use of capillary rise or infiltration from the top to introduce the binder or matrix material between the filaments of a high strength fiber can be applied to various combinations of materials for both the high strength fiber and the ductile matrix.

Obviously, many modifications and variations of the present invention are possible in the light of the above teachings. It is, therefore, to be understood that within

What is claimed:

1. A method for making reinforced metal composites comprising: orienting a plurality of fibers of reinforcing metal into parallel relationship; packing said fibers in close proximity to each other; securing said fibers in a bundle; placing the bottom of said fiber bundle in molten matrix material causing said matrix material to flow between said fibers through capillary action forming a composite and cooling said composite of fiber reinforced matrix.

2. A method for making reinforced metal composites comprising: orienting a plurality of fibers of reinforcing metal into parallel relationship; packing said fibers in close proximity to each other; placing said fibers in a tube having a slug of matrix material at the bottom thereof; heating said tube and said slug of matrix material causing said matrix material to become molten and flow between said fibers through capillary action forming a composite; cooling said composite and removing said composite from said tube.

3. A method for making reinforced metal composites comprising: orienting a plurality of fibers of reinforcing metal into parallel relationship; packing said fibers in close proximity to each other; securing said fibers in a bundle; placing a slug of matrix material at the top of said bundle; heating said bundle and matrix material causing said matrix material to melt and flow between said fibers forming said reinforced composite; and cooling said composite.

4. A method for making reinforced metal composites comprising: cleaning a plurality of cut lengths of fiber; orienting said fiber lengths into parallel relationship; loading said fiber lengths in a first tube; placing said first tube in a second closed end tube having a slug of matrix material in the bottom thereof; heating the assembly of tubes at a temperature sufficient to melt said slug of matrix material causing said matrix material to flow between said fibers through capillary action forming a fiber reinforced matrix; cooling said assembly; and removing said fiber reinforced matrix.

5. The method of claim 4 wherein said assembly is heated to 2200° F.

6. In a method for making a reinforced metal composite structure having a predetermined length; the steps of cutting fibers of reinforcing metal into lengths substantially equal to said predetermined length of said structure; orienting said cut fibers into parallel relationship; wrapping said cut fibers with a helix of wire to maintain the same in oriented position; flowing a metallic matrix into the space between said fibers to thereby form a composite structure; and unwrapping the helix from the composite structure.

References Cited in the file of this patent

UNITED STATES PATENTS

| | | |
|---|---|---|
| 967,145 | Simpson | Aug. 9, 1910 |
| 1,125,163 | Page | Jan. 19, 1915 |
| 1,342,801 | Gebauer | June 8, 1920 |
| 1,893,330 | Jones | Jan. 3, 1933 |
| 2,125,896 | Driggs et al. | Aug. 9, 1938 |
| 2,177,356 | Stone et al. | Oct. 24, 1939 |
| 2,305,555 | Peter et al. | Dec. 15, 1942 |
| 2,419,231 | Schantz | Apr. 22, 1947 |
| 2,932,071 | Whitehurst | Apr. 12, 1960 |
| 3,028,644 | Waldrop | Apr. 10, 1962 |
| 3,084,421 | McDaniels et al. | Apr. 9, 1963 |

FOREIGN PATENTS

| | | |
|---|---|---|
| 464,727 | Great Britain | Apr. 23, 1937 |